April 6, 1954   L. G. EKMAN   2,674,180
ARRANGEMENT IN TILTING BOILING PANS
Filed Nov. 9, 1950   2 Sheets-Sheet 1
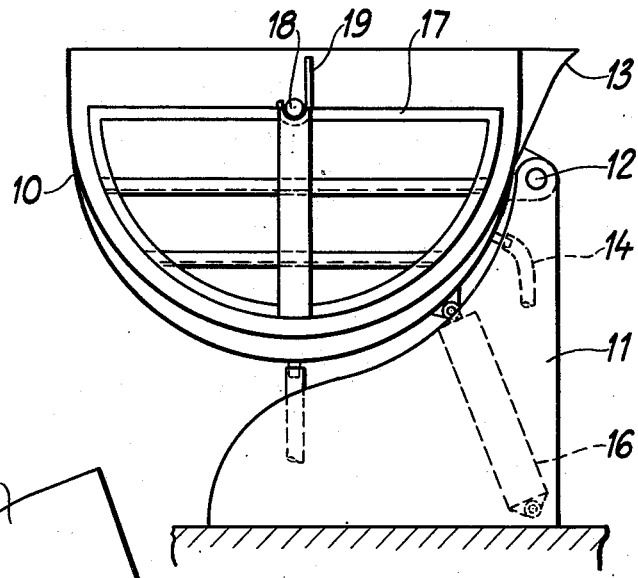
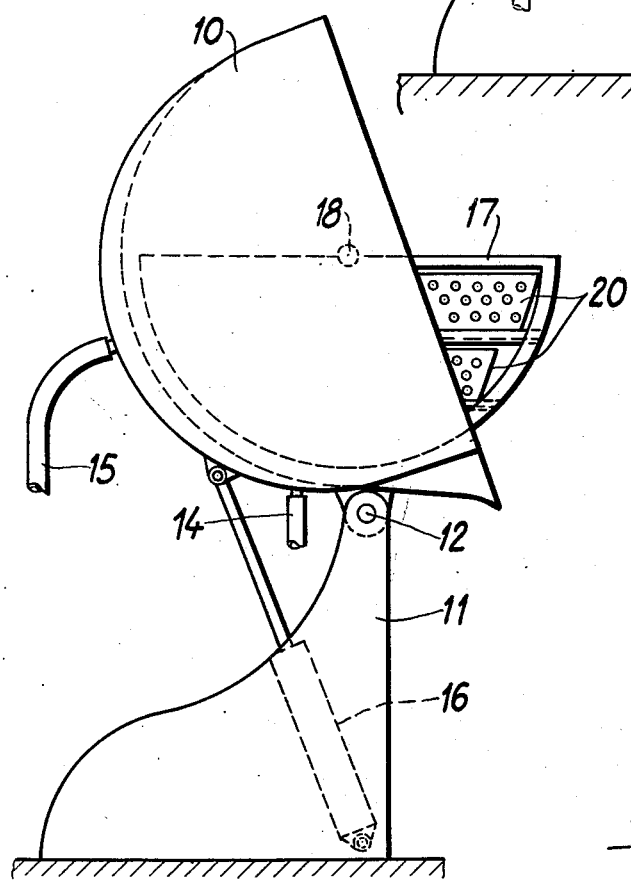
Inventor
L. G. Ekman April 6, 1954  L. G. EKMAN  2,674,180
ARRANGEMENT IN TILTING BOILING PANS
Filed Nov. 9, 1950  2 Sheets-Sheet 2

Inventor
L. G. Ekman

Patented Apr. 6, 1954

2,674,180

UNITED STATES PATENT OFFICE 2,674,180

ARRANGEMENT IN TILTING BOILING PANS

Lars Gustaf Ekman, Lidingo, Sweden, assignor of one-half to Allan Holmqvist Aktiebolag, Stockholm, Sweden, a Swedish company Application November 9, 1950, Serial No. 194,769

Claims priority, application Sweden November 10, 1949

13 Claims. (Cl. 99—403)

For boiling large quantities of goods in piece form, such as potatoes, fish, vegetables and so on, use is generally made of so-called boiling boxes. As a rule such a box is made in a parallelepipedical form and provided with a door in its front wall through which baskets containing the boiling goods can conveniently be put in and taken out. One disadvantage in boiling boxes is that the boiling can only be performed in steam but not in water as sometimes is desirable. In addition, a boiling box is a relatively costly device because of the fact that its structure must be made particularly strong even if in operation only low pressures are utilized.

In some cases, therefore, for boiling goods in piece form use has instead been made of rectangular pans in which baskets with the boiling goods are immersed. One then obtains the advantage that the boiling can take place both in steam generated by a measured quantity of water at the bottom of the pan and in water more or less covering the goods. However, this method has the great disadvantage that the work with immersing the baskets in the pan and lifting them out of it becomes heavy and burdensome for the kitchen personnel. Moreover, a pan which is to be used in this manner even if it is tiltable has to be provided with a drainage cock so that the water can be drawn off before the baskets are to be lifted.

These disadvantages are entirely eliminated by an arrangement according to the present invention.

According to the invention a tilting boiling pan or similar tilting device is provided with an inset rack adapted to carry the boiling goods or baskets for such goods and which is so arranged and suspended within the pan that in a vertical projection the various parts of said rack take up mutually unchanged positions irrespective of the tilting position of the pan. In a preferred embodiment the inset rack is supported within the pan freely rockable about an axis above its center of gravity and parallel to the tilting shaft of the pan. This form of execution is necessary in pans having their tilting shaft displaced towards their fronts as disclosed in my co-pending application Ser. No. 46,007 and is also very convenient in pans supported on lateral columns or brackets. In the latter case, however, the rack may also be nonrotatably supported on fixed neck journals extending coaxially through the stud shafts and the walls of the pan. In tilting, the pan in both cases turns relative to the inset rack which itself maintains an unchanged angular position. During the tilting operation the water flows off over the emptying spout and upon completion of the operation the rack lies in the forwardly facing opening of the pan with its baskets readily accessible. The invention thus provides a device for boiling goods in piece form which combines the advantage of the boiling box of being power-economizing in use with the possibilities of the open pan to boil in steam or water according to desire.

In view of the desirability of maximum utilization of the space available the pan is preferably made with a semi-cylindrical or semi-spherical bottom and the inset in the shape of a similar rack the radius of which is somewhat less than that of the bottom so as to provide for the necessary play between said inset and bottom. In pans having semi-spherical or semi-cylindrical bottoms the axes of the insets are conveniently disposed in such a manner as to substantially coincide with that line of symmetry of the bottom which is parallel to the tilting shaft of the pan, that is, with that diameter of the spherical bottom surface that is parallel to the last-mentioned shaft and with the axis of the cylindrical bottom surface respectively. In pans supported on lateral columns or brackets the shaft of the inset may preferably be placed in alignment with the tilting shaft of the pan.

The invention will be more closely explained in the following description of embodiments illustrated by way of example in the accompanying drawings.

Fig. 1 shows partly a sectional and partly a side elevational view of a pan in its normal position provided with an inset rack according to the invention.

Fig. 2 is a side elevational view of the same pan in the tilted position.

Figure 3:
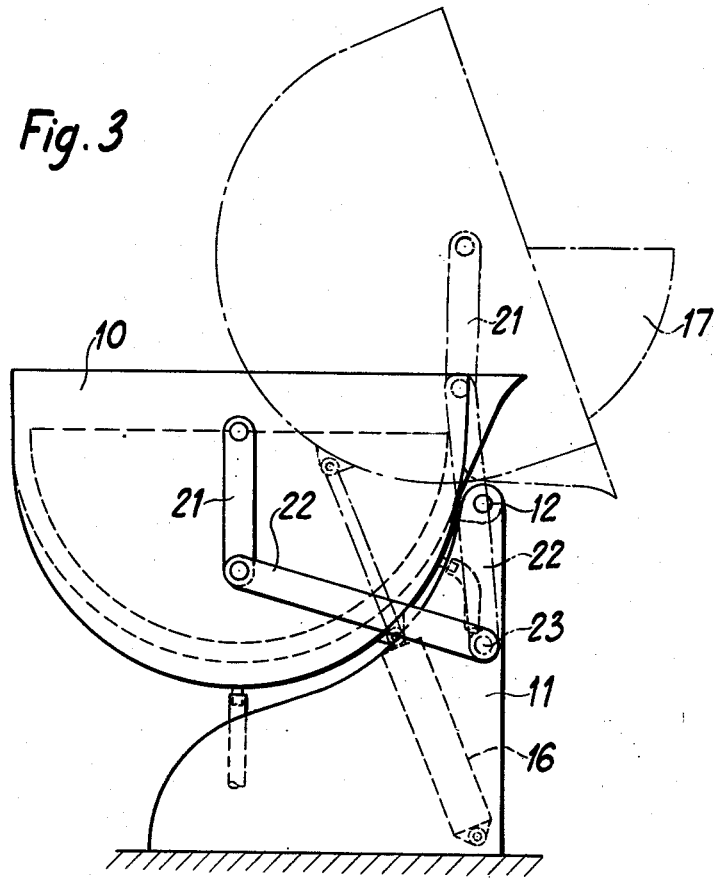
Fig. 3 is a side elevational view of a pan generally similar to that of Figs. 1 and 2 but provided with means for retaining the inset in the desired angular position.

Referring now to the drawings in which like reference numerals designate like details, 10 is the pan proper which may be assumed to have a substantially rectangular horizontal projection and a semi-cylindrical bottom and which at its front side is pivotally supported upon a tilting shaft 12 carried by a stand 11. Above said shaft the emptying spout 13 of the pan is disposed. Steam for heating is supplied to the steam chamber formed between the two jackets of the pan through a steam conduit 14 and the condensate drains off through a condensate conduit 15 connected to the bottom of the pan. For tilting the pan a hydraulic lifting mechanism 16 is accommodated in the stand 11, the piston rod of said mechanism operating against the bottom of the pan.

Within the pan an inset rack 17 is rockably suspended according to the invention. This inset rack may be constructed in different ways. In pans having a semi-cylindrical bottom, as has here been assumed, it preferably comprises a frame structure which is also of a semi-cylindrical shape and is longitudinally divided in a plurality of compartments each having one or more shelves for baskets for the boiling goods arranged above one another. At each end the inset rack has an extending shaft journal 18 resting in a journal bearing 19 attached to the inner side of the corresponding gable of the pan. The shaft journals which may also be formed of the ends of a through axle have to lie above the center of gravity of the inset according to the invention and are suitably disposed in such a manner that their geometrical axes coincide with the axis of the semi-cylindrical inset 17. At the same time it is also convenient to arrange the journal bearings 19 such that the inset becomes coaxial with the pan bottom. The journal bearings 19 preferably have the form of upwardly open bearing cups in which the shaft journals of the inset are resting freely so that the inset may readily be suspended in and removed from the pan. In order to ensure safe retainment of the inset also in the fully tilted position of the pan these bearing cups, as shown in the drawing, are provided with an extension at the side facing towards the tilting shaft. Instead of upwardly open bearing cups 19 on the pan and shaft journals 18 on the inset cooperating therewith one may of course use shaft journals on the pan and downwardly open bearing cups on the inset.

From a comparison between Figs. 1 and 2, which as stated before show a pan according to the invention in its normal or boiling position and in its tilted position respectively, it will be seen that the shelves of the inset rack for the baskets for the boiling goods which are horizontal in Fig. 1 also after the tilting operation take up a horizontal position because of the fact that during the tilting the inset rack has been capable of turning about its axis 18 relative to the pan. Moreover, through this turning movement the front portion of the inset rack is swung forwards in the forwardly turned opening of the pan so that the baskets for boiling goods, two of which are indicated at 20 in Fig. 2, may readily be pulled out from and pushed in on the shelves of the inset. In order to prevent the inset rack from tipping because of an unequal distribution of weight during its charging and discharging a locking means (not shown) is preferably provided whereby the inset rack may be locked in a predetermined angular position relative to the pan.

Figure 4:
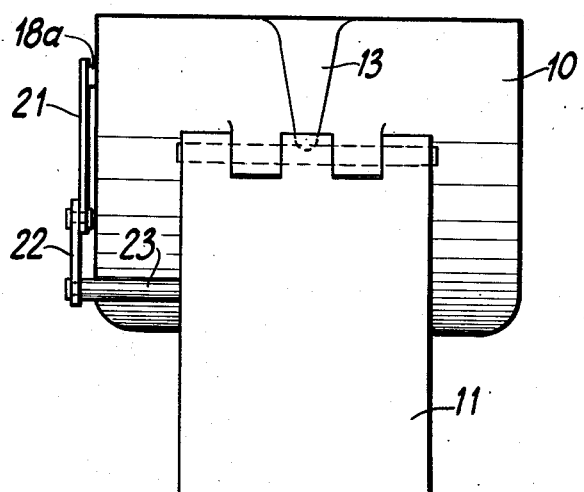
Fig. 4 is a front view of the pan of Fig. 3.

In loading the rack of the embodiment just described the operator must see to it that the weight of the load becomes approximately equally distributed on both sides of the shaft journals of the rack so that the shelves of the rack remains horizontal or nearly so also after release of the locking means and the return of the pan to its boiling position. The requirements to such an adjustment of the load are avoided and the working of the pan considerably simplified by using an embodiment as illustrated in Figs. 3 and 4.

This embodiment is generally similar to that of Figs. 1 and 2 but includes means capable of holding the rack 17 with the shelves in a horizontal position, while permitting it to follow the pan 10 in its tilting movement. These means comprise an extension 18a of one of the shaft journals of the rack which extension projects through one of the end walls of the pan. To said extension 18a one end of a preferably vertical arm 21 is rigidly connected. To the free end of said arm one end of a link 22 is pivotally connected and the other end of said link is rotatably supported on a shaft 23 extending laterally of the stand 11. The arrangement is such that the centres of the extension 18a, the pivotal connection between the arm 21 and link 22, the shaft 23 and the tilting shaft 12 are at the four corners of a parallelogram and, moreover, that the lengths of the arm 21 and link 22 are sufficient to permit the pan to be moved to its fully tilted position. The positions of the various parts of the pan in the fully tilted condition are shown in dot and dash lines in Fig. 3.

While in the preceding description the invention has been described in detail in connection with the embodiments shown in the accompanying drawings the invention must not be considered limited thereto but, of course it should also be considered to include all other embodiments and modifications falling within the scope of the inventive idea. Also, the stated application in connection with tilting boiling pans is to be considered as a non-limiting example only, selected among the application possibilities presenting themselves in other devices tiltable in a similar way.

What I claim is:

1. In a tiltable pan structure, the combination of a support, an open top receptacle adapted to be heated, means for supporting the receptacle including horizontal pivot means connected in part to the support and in part connected to the receptacle above the bottom thereof and to one side of the vertical plane passing through the center of the receptacle and about which the receptacle tilts, inset rack means of less dimensions than the receptacle for receiving products to be heated, and supporting means including cooperable means embodied respectively between said receptacle and said rack means for horizontally supporting the rack within the receptacle, said last-mentioned means being operable to maintain said rack horizontal irrespective of the tilting relation assumed by the receptacle and the receptacle in its tilting movement being displaced from a lower position with the top horizontal to an upper position with the top inclined downwardly and said tilting movement raising the rack means while in a horizontal position upwardly and projecting the rack means at least partially exteriorly of the downwardly inclined top of the receptacle to provide ready access thereto.

2. The combination as defined in and by claim 1 in which the supporting means for the rack means includes a bearing means with respect to which the inset is rotatable and which bearing means is disposed above the center of gravity of the rack inset in parallelism to the axis of the pivot means about which the receptacle tilts.

3. The combination as defined in and by claim 1 and in which the receptacle includes end walls, cooperable shaft and bearing means embodied respectively with the said end walls and the rack inset located above the horizontal pivot means when the top of the receptacle is horizontal in its lowermost position.

4. The combination as defined in and by claim 3 and further including means cooperable with a supporting means for the rack inset to positively prevent turning of the inset about its axis of suspension while permitting the inset to move with the pan in its tilting movement.

5. The combination as defined in and by claim 1 and in which the receptacle includes end walls, cooperable shaft and bearing means embodied respectively with the said end walls and the rack inset located above the horizontal pivot means when the top of the receptacle is horizontal in its lowermost position, and said cooperable shaft and bearing means comprising upwardly open bearing cups embodied with the end walls of the receptacle and stub shafts embodied with the rack inset disposed in said cups.

6. The combination as defined in and by claim 5 in which the upwardly open cups include opposite side portions including portions facing the horizontal pivot means about which the receptacle tilts said facing portions being of greater axial extent than the opposite side portion so as to prevent disassociation of the inset from the cups during the tilting movement of the receptacle and elevation of the rack inset.

7. The combination as defined in and by claim 1 and further including means for tilting said receptacle, and means cooperable with the supporting means for the rack inset positively preventing turning movement of the inset relative to the receptacle while permitting the inset to move upwardly during the tilting movement of the receptacle, said last-mentioned means including linkage mechanism.

8. In a composite receptacle arrangement for subjecting products to a heating action including at least partial immersion in liquid, a combination including a standard having an upwardly extending arm, an open top receptacle having opposite sides and a bottom, means defining a pouring lip on one of the sides, horizontally extending pivot means connecting the receptacle to the arm at the side of the receptacle embodying the pouring lip at an area of the receptacle above the bottom thereof when the receptacle is in a lowermost position with its top horizontal, said pivot means providing for movement of the receptacle displacing the top from the lowermost horizontal position to an elevated inclined position, inset rack means of less dimensions than the dimensions of the receptacle removably disposed within the receptacle and elevatable therewith, supporting means for said rack means including cooperable elements embodied respectively with the receptacle and rack means for rotatably supporting the rack means relative to the receptacle whereby with the receptacle in its lowermost position with the top horizontal the rack means is likewise horizontal, and said rack supporting means being operable when said receptacle is tilted to lift said rack means with said receptacle with the rack maintaining a horizontal position irrespective of the angle of tilt of the receptacle and when the receptacle has been tilted upwardly, said rack means projecting horizontally beyond the open top permitting ready access thereto and the tilting movement likewise emptying any liquid from the receptacle.

9. The combination as defined in and by claim 8 and including means for tilting said receptacle.

10. The combination as defined in and by claim 9 in which said tilting means includes fluid pressure responsive means including piston and cylinder elements one of which is pivotally connected to the receptacle and the other of which is pivotally connected to the standard.

11. The combination as defined in and by claim 8 in which supporting means for the rack inset includes a shaft means embodied with the inset, bearing means embodied with the receptacle journalling said shaft means, said shaft means projecting laterally beyond said receptacle, and linkage mechanism operably connected between said shaft means and said arm and movable when the receptacle is tilted to permit lifting movement of said rack inset while positively preventing rotatable displacement thereof so that said inset remains horizontal during tilting movement of said receptacle.

12. In a composite receptacle arrangement for subjecting products to a heating action including at least partial immersion in liquid, a combination including a standard having an upwardly extending arm, an open top receptacle having opposite sides and a bottom, means defining a pouring lip on one of the sides, horizontally extending pivot means connecting the receptacle to the arm at the side of the receptacle embodying the pouring lip at an area of the receptacle above the bottom thereof when the receptacle is in a lowermost position with its top horizontal, said pivot means providing for movement of the receptacle displacing the top from the lowermost horizontal position to an elevated inclined position, inset rack means of less dimensions than the dimensions of the receptacle removably disposed within the receptacle and elevatable therewith, supporting means for said rack means including shaft means embodied with the inset, bearing means embodied with the receptacle for journaling said shaft means, said shaft means including a portion projecting laterally beyond said receptacle, and linkage mechanism operably connected between the projecting portion of said shaft means and said arm including a first link rigidly connected with said shaft means extending vertically downward when said receptable is horizontal, a second link pivotally connected to said first link and extending at a downward inclination toward and terminating subjacent said horizontal pivot means a distance below the same substantially equal to the longitudinal extent of said first link, and shaft means extending laterally of the arm rotatably supporting said terminal end of said second link, the length and disposition of said links and location of the axis of both said shaft means relative to said horizontal pivot axis providing a three-sided parallelogram linkage sufficient to permit tilting movement of said receptacle to its fully tilted position while positively preventing rocking movement of said rack relative to said receptacle.

13. In a composite receptacle arrangement for subjecting products to a heating action including at least partial immersion in liquid, a combination including a standard having an upwardly extending arm, an open top receptacle having opposite sides and a bottom, means defining a pouring lip on one of the sides, horizontally extending pivot means connecting the receptacle to the arm at the side of the receptacle embodying the pouring lip at an area of the receptacle above the bottom thereof when the receptacle is in a lowermost position with its top horizontal, said pivot means providing for movement of the receptacle displacing the top from the lowermost horizontal position to an elevated inclined position, inset rack means of less dimensions than the dimensions of the receptacle removably disposed within the receptacle and elevatable therewith, supporting means for said rack means including shaft means embodied with the inset, bearing means embodied with the receptacle for journaling said shaft means, said shaft means including a portion projecting laterally beyond said receptacle, and linkage mechanism operably connected between the projecting portion of said shaft means and said arm including a first link rigidly connected with said shaft means extending vertically downward when said receptacle is horizontal, a second link pivotally connected to said first link and extending at a downward inclination toward and terminating subjacent said horizontal pivot means a distance below the same substantially equal to the longitudinal extent of said first link, and shaft means extending laterally of the arm rotatably supporting said terminal end of said second link, the length and disposition of said links and location of the axis of both said shaft means relative to said horizontal pivot axis providing a three-sided parallelogram linkage sufficient to permit tilting movement of said receptacle to its fully tilted position while positively preventing rocking movement of said rack relative to said receptacle, and fluid actuated means for tilting said receptacle including piston and cylinder means one of which is pivotally connected to the receptacle and the other of which is pivotally connected to the standard.

References Cited in the file of this patent

UNITED STATES PATENTS

| Number | Name | Date |
|---|---|---|
| 98,244 | Gibson | Dec. 28, 1869 |
| 236,628 | Rice | Jan. 11, 1881 |
| 457,208 | Mitchell | Aug. 4, 1891 |
| 558,079 | Keys | Apr. 14, 1896 |
| 1,860,390 | La Rock | May 31, 1932 |

FOREIGN PATENTS

| Number | Country | Date |
|---|---|---|
| 144,017 | Germany | Jan. 9, 1903 |
| 9,823 | Great Britain | Dec. 28, 1843 |